Oct. 4, 1932.  J. COLAIZZI  1,880,814
BRACKETED CONTAINER
Filed March 4, 1932  3 Sheets-Sheet 1

John Colaizzi
INVENTOR
BY Victor J. Evans & Co.
ATTORNEY

Oct. 4, 1932.  J. COLAIZZI  1,880,814
BRACKETED CONTAINER
Filed March 4, 1932  3 Sheets-Sheet 2

John Colaizzi INVENTOR
BY Victor J. Evans & Co.
ATTORNEY

Oct. 4, 1932.  J. COLAIZZI  1,880,814
BRACKETED CONTAINER
Filed March 4, 1932  3 Sheets-Sheet 3
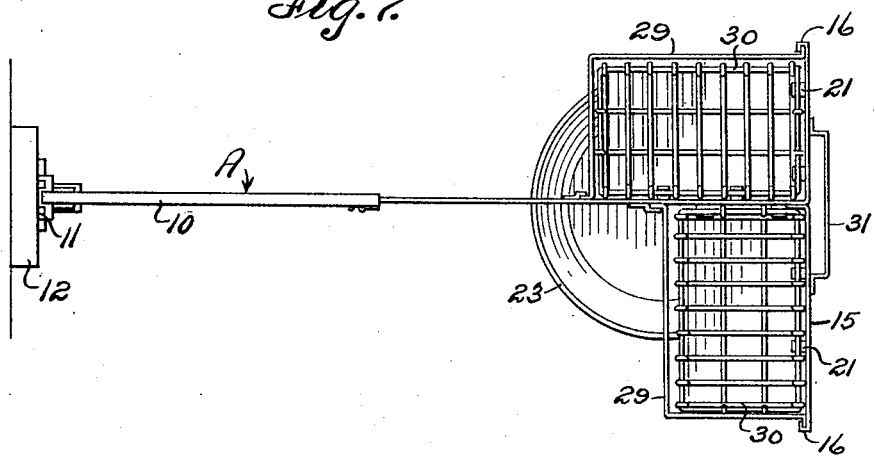
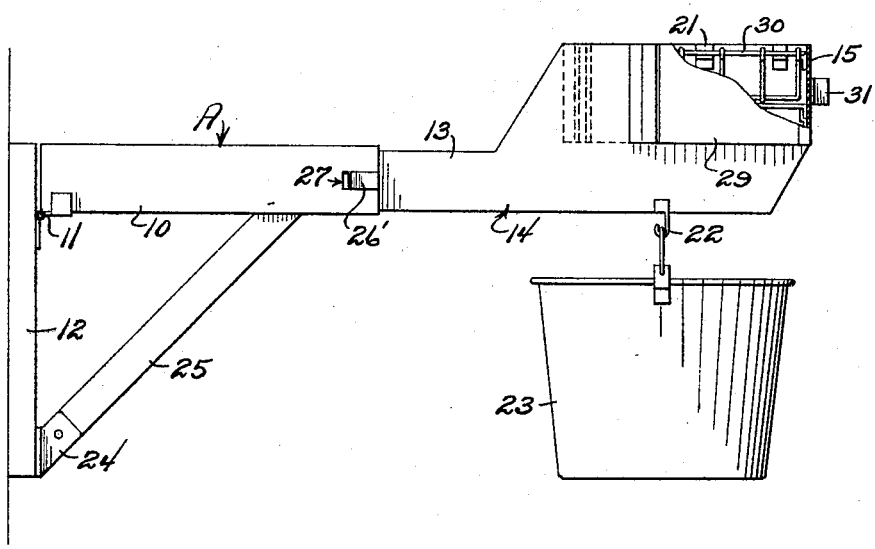
John Colaizzi INVENTOR
BY Victor J. Evans & Co. ATTORNEY Patented Oct. 4, 1932

1,880,814

UNITED STATES PATENT OFFICE

JOHN COLAIZZI, OF PITTSBURGH, PENNSYLVANIA

BRACKETED CONTAINER

Application filed March 4, 1932. Serial No. 596,885.

The invention relates to a bracketed container and more especially to a sanitary cleaning medium container.

The primary object of the invention is the provision of a device of this character, wherein the bracket is mountable beneath a kitchen sink and removably supports containers adaptable for receiving soap, sponges, brushes, cloths and buckets, as well as drip pans so that those mediums employed for cleaning purposes can be conveniently held when not in use and to assure sanitation thereto, the mediums for cleaning purposes being readily accessible and while not in use will be out of the way and conveniently held for free accessibility by a user.

Another object of the invention is the provision of a device of this character, wherein the construction thereof is novel in form and can be readily adjusted so that cleaning mediums held therein may be hidden from view and held in a manner for sanitary purposes and also readily accessible for use.

A further object of the invention is the provision of a device of this character which is extremely simple in construction, thoroughly reliable and efficient in its purposes, strong, durable, and inexpensive to manufacture.

With these and other objects in view, the invention consists in the features of construction, combination and arrangement of parts as will be hereinafter more fully described, illustrated in the accompanying drawings, which disclose the preferred embodiment of the invention, and pointed out in the appended claims.

In the accompanying drawings:—

Figure 7 is a top plan view of a slight modified form.

Figure 8 is a side elevation thereof and partly in section.

Similar reference characters indicate corresponding parts throughout the several views in the drawings.

Figure 1:
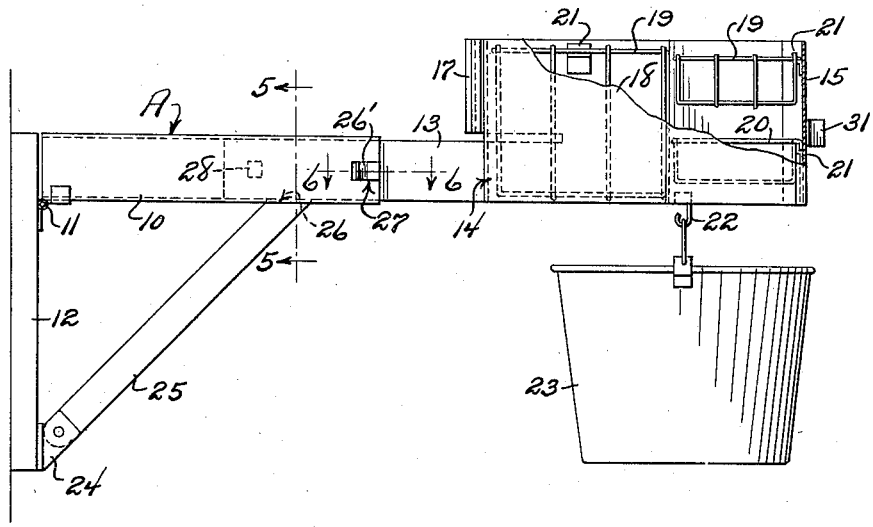
Figure 1 is a side elevation partly in section of the device constructed in accordance with the invention.

Referring to the drawings in detail, particularly Figures 1 to 6 inclusive, the device comprises an extensible bracket A including a tubiform section 10 provided at one end with a hinge 11 connecting it to a base plate 12 for vertical swinging movement. The plate 12 is adapted to be secured to a vertical partition or wall beneath a kitchen sink although it may be elsewhere mounted and within this section 10 is telescopically fitted the stem portion 13 of an adjustable section 14 having a front cross piece 15 provided with vertically disposed inwardly directed cleat-like end portions 16, while the section 14 carries a vertically disposed double cleat 17 located at opposite sides thereof and these portions 16 and 17 accommodate removable side sections 18.

Arranged within the side sections 18 between the same and the section 14 and end piece 15 is a series of removable containers or baskets 19 and a drip pan 20, these being removably supported upon hangers 21 provided on the section 14 and end piece 15. The containers or baskets 19 are of the wire frame type and are designed to accommodate soap, sponges, brushes, cloths or other mediums used for cleaning purposes.

The section 14 carries a depending hook 22 for the hanging of a bucket 23 thereon.

Arranged on the base plate 12 below the hinge 11 is a mounting 24 pivotally supporting a brace 25 adapted for vertical swinging movement and this brace is engageable in a socket 26 in the lower edge of the section A so that when it is engaged in said socket the section A will be sustained in a horizontal position. The section A at its outer end has thereon a spring latch 26' working through a suitable opening 27 to engage in a slot 28 in the stem 13 of the section 14, the slot 28 being adjacent to the free end of said stem and thus on pulling outwardly upon the section 14 the latch 26' will frictionally lock the said section 14 in extended relation to the section A so that the containers 19 can be disposed beyond the sink (not shown) when the device is mounted therebeneath and free access may be had to the contents of the containers for their use. When the section 14 is pushed inwardly the stem 13 will slide within the section A for the contracting of the device and the concealing thereof beneath the kitchen sink.

Figure 2:
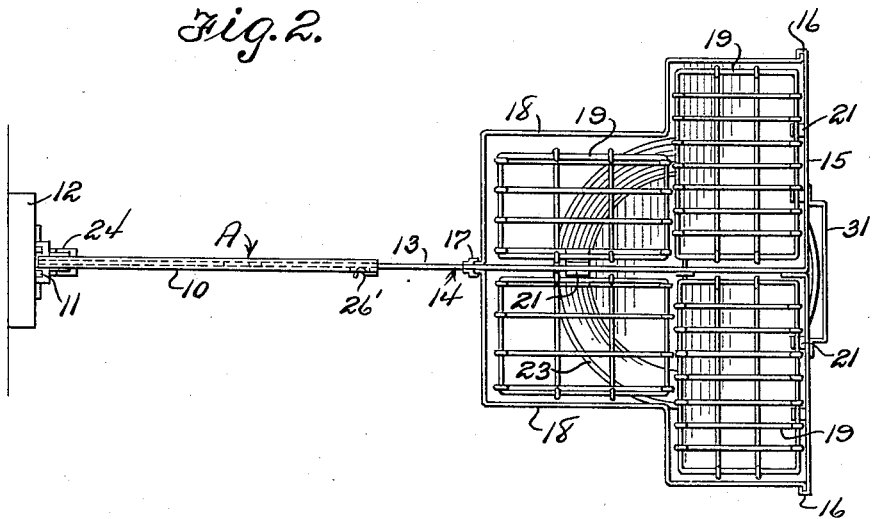
Figure 2 is a top plan view thereof.
Figure 3:
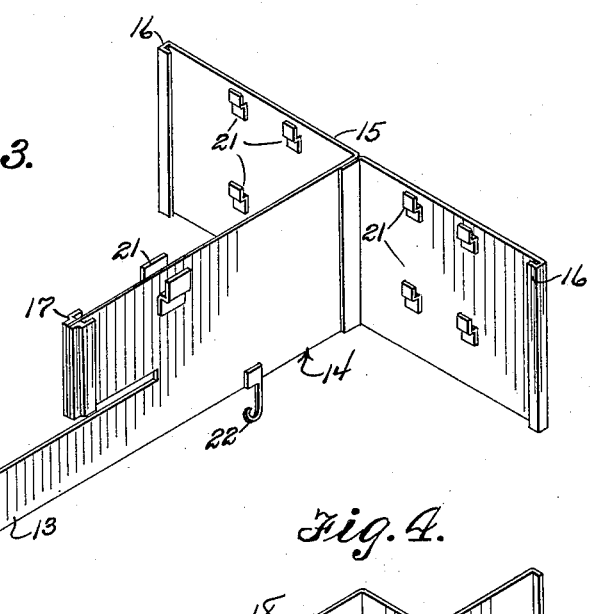
Figure 3 is a perspective view of one part of the bracket of the device.
Figure 4:
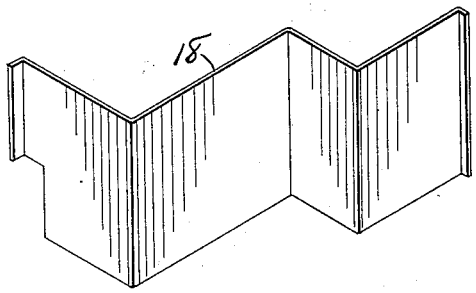
Figure 4 is a perspective view of one of the side pieces removed from the bracket.
Figure 5:
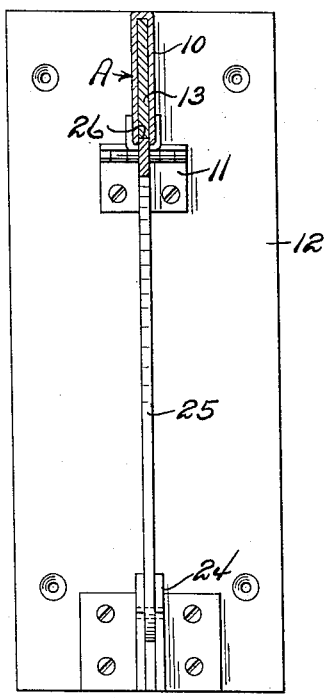
Figure 5 is an enlarged sectional view on the line 5—5 of Figure 1 looking in the direction of the arrows.
Figure 6:
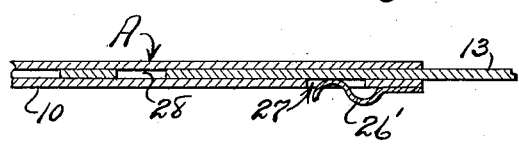
Figure 6 is a fragmentary sectional view on the line 6—6 of Figure 1 looking in the direction of the arrows.

In Figures 7 and 8 there is shown a slight modification of the device, wherein the side sections 29 are so shaped and of a size to restrict the number of containers 30 to be held within the device, namely, two containers in lieu of the number as shown in Figures 1 and 2 of the drawings, otherwise the modified form of the device simulates the preferred form disclosed in Figures 1 to 6 of the drawings.

The front piece 15 at its outer side has a handle 31 thereon to permit manual manipulation in extending or contracting the device as should be obvious.

What is claimed is:—

1. A device of the character described, comprising a bracket formed with a sleeve-like section, an extensible section telescoped in said sleeve-like section, a cross piece at the outer end of the extensible section, hangers on the extensible section and cross piece and adapted to support holders, cleats on the extensible section and cross piece, and side sections engaged in the cleats and confining the holders when upon the hangers.

2. A device of the character described, comprising a base plate, a tubiform section mounted upon the base plate for vertical swinging movement, an extensible section having a stem fitted in the tubiform section, means for latching the stem extended or contracted within the tubiform section, side sections removably fitted on the extensible section, hangers on the extensible section and adapted to support holders for confinement by the side sections, and means on the base plate for engagement with the tubiform section to hold the same normally in horizontal position.

In testimony whereof I affix my signature.

JOHN COLAIZZI.